US011481656B2

(12) United States Patent
Wan et al.

(10) Patent No.: US 11,481,656 B2
(45) Date of Patent: Oct. 25, 2022

(54) METHOD AND APPARATUS FOR EVALUATING A MATCHING DEGREE OF MULTI-DOMAIN INFORMATION BASED ON ARTIFICIAL INTELLIGENCE, DEVICE AND MEDIUM

(71) Applicant: BEIJING BAIDU NETCOM SCIENCE AND TECHNOLOGY CO., LTD., Beijing (CN)

(72) Inventors: Shengxian Wan, Beijing (CN); Yu Sun, Beijing (CN); Dianhai Yu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1096 days.

(21) Appl. No.: 16/008,559

(22) Filed: Jun. 14, 2018

(65) Prior Publication Data
US 2018/0365579 A1    Dec. 20, 2018

(30) Foreign Application Priority Data
Jun. 15, 2017    (CN) .......................... 201710452619.X

(51) Int. Cl.
*G06N 3/04*     (2006.01)
*G06K 9/62*     (2022.01)
(Continued)

(52) U.S. Cl.
CPC ......... *G06N 5/046* (2013.01); *G06F 16/3334* (2019.01); *G06F 16/3347* (2019.01);
(Continued)

(58) Field of Classification Search
CPC .................................................. G06N 5/046
See application file for complete search history.

(56) References Cited

U.S. PATENT DOCUMENTS 10,606,846 B2 * 3/2020 Li ........................ G06N 7/005
2020/0042597 A1 * 2/2020 Wu ....................... H04L 51/02

FOREIGN PATENT DOCUMENTS

CN    101246492 A    8/2008
CN    102890711 A    1/2013
(Continued)

OTHER PUBLICATIONS

Seo "Bi-Directional Attention Flow for Machine Compression", 2017 (Year: 2017).*
(Continued)

*Primary Examiner* — Ann J Lo
*Assistant Examiner* — Van C Mang
(74) *Attorney, Agent, or Firm* — Brooks Kushman P.C.

(57) ABSTRACT

The present disclosure provides a method and apparatus for evaluating a matching degree of multi-domain information based on artificial intelligence, a device and a medium. The method comprises: respectively obtaining valid words in a query, and valid words in each information domain in at least two information domains in a to-be-queried document; respectively obtaining word expressions of valid words in the query and word expressions of valid words in said each information domain in at least two information domains in the to-be-queried document; based on the word expressions, respectively obtaining context-based word expressions of valid words in the query and context-based word expressions of valid words in said each information domain; generating matching features corresponding to said each information domain according to the obtained information; determining a matching degree score between the query and the to-be-queried document according to the matching features corresponding to said each information domain.

27 Claims, 4 Drawing Sheets

(51) Int. Cl.
  *G06F 16/33* (2019.01)
  *G06F 16/44* (2019.01)
  *G06N 5/04* (2006.01)

(52) U.S. Cl.
  CPC ......... *G06K 9/6201* (2013.01); *G06K 9/6274* (2013.01); *G06N 3/0445* (2013.01); *G06N 3/0454* (2013.01)

(56) References Cited

FOREIGN PATENT DOCUMENTS

| | | |
|---|---|---|
| CN | 102945273 A | 2/2013 |
| CN | 105808739 A | 7/2016 |
| CN | 106815252 A | 6/2017 |
| JP | 2015179385 A | 10/2015 |

OTHER PUBLICATIONS

Zhang, "Attentive Interactive Neural Networks for Answer Selection in Community Question Answering", 2017 (Year: 2017).*
Yunhua Hu, "Query Segmentation for Relevance Ranking in Web Search", 2013 (Year: 2013).*
Yu Wu, "Sequential Matching Network: A New Architecture for Multi-turn Response Selection in Retrieval-Based Chatbots", 2017 (Year: 2017).*
Chinese Office Action dated Apr. 2, 2020, for related Chinese Appln. No. 201710452619.X; 9 Pages.
Chinese Search Report dated Mar. 22, 2020 for related Chinese Appln. No. 201710452619.X; 4 Pages.
Second Chinese Office Action dated Sep. 16, 2020, for related Chinese Appln. No. 201710452619.X; 9 Pages.
Positional Sentence Representations—A Deep Architecture for Semantic Matching with Multiple Positional Sentence Representations by S. Wan, Y. Lan, J. Guo, J. Xu, L. Pang and X. Cheng; AAAI '16: Proceedings of the Thirtieth AAAI Conference on Artificial Intelligence; Feb. 2016; pp. 2835-241.

* cited by examiner

METHOD AND APPARATUS FOR EVALUATING A MATCHING DEGREE OF MULTI-DOMAIN INFORMATION BASED ON ARTIFICIAL INTELLIGENCE, DEVICE AND MEDIUM

The present application claims the priority of Chinese Patent Application No. 201710452619X, filed on Jun. 15, 2017, with the title of "Method and apparatus for evaluating a matching degree of multi-domain information based on artificial intelligence, device and medium". The disclosure of the above applications is incorporated herein by reference in its entirety.

FIELD OF THE DISCLOSURE

The present disclosure relates to the technical field of computer application, and particularly to a method and apparatus for evaluating a matching degree of multi-domain information based on artificial intelligence, a device and a medium.

BACKGROUND OF THE DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a new intelligent machine capable of responding in a manner similar to human intelligence. The studies in the field comprise robots, language recognition, image recognition, natural language processing, expert systems and the like.

A kernel task of information retrieval is calculating a semantic relevance degree between a user-input query and documents as retrieval objects. Specifically, it is feasible to evaluate the matching degree between the query and titles of documents, for example, calculate a matching degree score between the query and titles, rank the documents in a descending order of the scores, and then regard the documents ranking top N after the ranking as retrieval results and return them to the user, N being a positive integer.

In the prior art, the following manner is usually employed when the matching degree score between the query and the title is calculated: first use a Convolutional Neural Network (CNN), a Recurrent Neural Network (RNN) or the like to respectively obtain expressions of the query and the title, and then calculate for example cosine similarity based on the two expressions, thereby obtaining the matching degree score between the query and the title.

However, upon performing information retrieval in the prior art, it is feasible to calculate the matching degree score between the query and the title only according to the title of the document, and determine whether the document is matched with the query. However, the title is usually short and can only contain a small portion of key content, so this causes an undesirable accuracy in determining whether the document is matched with the query only according to the matching degree score between the query and the title.

SUMMARY OF THE DISCLOSURE

The present disclosure provides a method and apparatus for evaluating a matching degree of multi-domain information based on artificial intelligence, a device and a medium, to improve the accuracy of the matching of the document and the query upon information retrieval.

The present disclosure provides a method for evaluating a matching degree of multi-domain information based on artificial intelligence, the method comprising:

respectively obtaining valid words in a query, and valid words in each information domain in at least two information domains in a to-be-queried document;

respectively obtaining word expressions of valid words in the query and word expressions of valid words in said each information domain in at least two information domains in the to-be-queried document;

based on the word expressions, respectively obtaining context-based word expressions of valid words in the query and context-based word expressions of valid words in said each information domain;

generating matching features corresponding to said each information domain according to the obtained information;

determining a matching degree score between the query and the to-be-queried document according to the matching features corresponding to said each information domain.

Further optionally, in the aforesaid method, the respectively obtaining word expressions of valid words in the query and word expressions of valid words in each information domain in at least two information domains in the to-be-queried document comprises:

respectively embedding valid words in the query into a low-dimensional vector, thereby obtaining a sequence Qe=[q1, ..., qi, ..., qm];

wherein m represents the number of valid words included in the query, and qi represents the low-dimensional vector of the $i^{th}$ valid word in the query, wherein i is a positive integer and $1 \le i \le m$;

embedding valid words in said each information domain into a low-dimensional vector respectively to obtain a sequence Te=[t1, ..., tj, ..., tn];

wherein n represents the number of valid words included in each information domain, and tj represents the low-dimensional vector of the $j^{th}$ valid word in the information domain, wherein j is a positive integer and $1 \le j \le n$.

Further optionally, in the aforesaid method, the respectively obtaining context-based word expressions of valid words in the query and context-based word expressions of valid words in the information domain comprises:

inputting the Qe into a bi-directional recurrent neural network RNN to respectively obtain an output Q1 after processing in a left-right direction and an output Q2 after processing in a right-left direction;

inputting the Te into a bi-directional CNN to respectively obtain an output T1 after processing in a left-right direction and an output T2 after processing in a right-left direction;

joining the Qe, Q1 and Q2 to obtain Q(m, 3d), wherein d represents an expression dimension, and the embedding and the bi-directional RNNs use the same expression dimension;

joining the Te, T1 and T2 to obtain T(n, 3d);

regarding a 3d-long vector corresponding to each valid word in the query and each information domain as a context-based word expression of the valid word.

Further optionally, in the aforesaid method, the generating matching features corresponding to each information domain according to the obtained information comprises:

generating local matching features corresponding to said each information domain according to obtained information;

generating advanced matching features corresponding to said each information domain according to the local matching features.

Further optionally, in the aforesaid method, the generating local matching features corresponding to said each information domain according to obtained information comprises:

in each information domain, according to context-based word expressions of valid words and respectively in different matching degree calculating manners, calculating the matching degree between one of valid words in the query and one of valid words in the information domain, to obtain a 3D tensor (m, n, t) corresponding to the information domain;

wherein t represents a t-dimensional vector, t matching degrees are respectively calculated with respect to each group of valid words Q[i] and T[j], the t matching degrees constitute a t-dimensional vector, Q[i] represents valid words in the query, and T[j] represents valid words in the information domain;

each value (i, j, k) in the tensor represents the $k^{th}$ matching degree corresponding to Q[i] and T[j], and 1≤k≤t.

Further optionally, in the aforesaid method, the generating advanced matching features corresponding to said each information domain according to the local matching features comprises:

in said each information domain, inputting the (m, n, t) into the convolutional neural network CNN, and regarding obtained output (m, n, t1), . . . (m, n, tw), as the advanced matching features corresponding to the information domain, wherein w is a positive integer and represents the number of convolutional layers in the CNN.

Further optionally, in the aforesaid method, the determining a matching degree score between the query and the to-be-queried document according to the matching features corresponding to said each information domain comprises:

in said each information domain, joining the corresponding (m, n, t) and the corresponding advanced matching features so as to obtain (m, n, t+t1+ . . . +tw);

in said each information domain, determining a (m, k') sequence expression in a manner of pooling as per row with respect to each (m, n) matrix, k' being a positive integer, to obtain (m, (t+t1+ . . . +tw)*k');

joining (m, (t+t1+ . . . +tw)*k') in said at least two information domains to obtain (m, (t+t1+ . . . +tw)*k'*p), wherein the p is the number of information domains;

inputting the (m, (t+t1+ . . . +tw)*k'*p) into the bi-directional RNN to obtain an expression at a final position of the bi-directional RNN;

determining the matching degree score according to the expression at the final position.

Further optionally, in the aforesaid method, the determining a (m, k') sequence expression in a manner of pooling as per row with respect to each (m, n) matrix comprises:

selecting k' largest values from n values in each row of (m, n), and ranking in a descending order, wherein k'≤n.

Further optionally, in the aforesaid method, the expression at the final position is a 2f-long vector, f representing an expression dimension;

the determining the matching degree score according to the expression at the final position comprises:

inputting the 2f-long vector into a fully-connected network including a single hidden layer to obtain the output matching degree score.

Further optionally, in the aforesaid method, if the at least two information domains include the content, the obtaining valid words in said each information domain in at least two information domains in a to-be-queried document specifically comprises:

obtaining the valid words in the content of the to-be-queried document.

Further optionally, in the aforesaid method, the obtaining the valid words in the content of the to-be-queried document specifically comprises performing word segmentation processing for the content to obtain a word sequence formed by a plurality of words arranged in a sequential order in the content;

using a preset window to scan a plurality of words included by the word sequence in a successive order, to obtain a plurality of word segments;

calculating a BM25 score of each word segment and the query;

obtaining, from the plurality of word segments, K word segments that have the highest BM25 scores and do not overlap;

regarding the words included by the K word segments, as valid words when the information domain is the content.

Further optionally, in the aforesaid method, the obtaining the valid words in the content of the to-be-queried document specifically comprises performing word segmentation processing for the content to obtain a plurality of words arranged in a sequential order in the content;

generating a bi-channel matching matrix according to the valid words in the query and the words in the plurality of words in the content;

inputting the bi-channel matching matrix into a convolutional neural network CNN, and extracting the matching matrix generated by the uppermost layer of CNN;

from the matching matrix generated by the uppermost layer of CNN and by employing a pooling manner, selecting K positions with the highest scores, no window overlap existing between word segments corresponding to the positions and obtained by division according to a size of the preset window;

regarding words included in the word segments in windows corresponding to K positions, as valid words when the information domain is the content.

Further optionally, in the aforesaid method, the generating a bi-channel matching matrix according to the valid words in the query and the words in the plurality of words in the content specifically comprises:

precisely comparing the valid words in the query with words in the plurality of words of the content: if they are the same, a matching value at a position corresponding to a precise matching matrix is a weight of an Inverse Document Frequency of the valid words; if they are different, the value is 0 and a m*s-dimensional of precise matching matrix is obtained, wherein m is the number of words of valid words included in the query, and s is the number of the plurality of words included by the content;

embedding the valid words in the query and the words in the plurality of words of the content respectively into a low-dimensional vector;

respectively calculating a cosine similarity of the low-dimensional vector of the valid words in the query and the low-dimensional vector of the words in the plurality of words, and regarding the cosine similarity as a matching value at a corresponding position in a semantic-based matching matrix, to obtain a m*s-dimensional semantic-based matching matrix;

obtaining an m*s*2 bi-channel matching matrix according to the m*s-dimensional precise matching matrix and the m*s-dimensional semantic-based matching matrix.

The present disclosure provides an apparatus for evaluating a matching degree of multi-domain information based on artificial intelligence, the apparatus comprising:

a valid word obtaining module configured to respectively obtain valid words in a query, and valid words in each information domain in at least two information domains in a to-be-queried document;

an expression obtaining module configured to respectively obtain word expressions of valid words in the query and word expressions of valid words in said each information domain in at least two information domains in the to-be-queried document;

the expression obtaining module further configured to, based on the word expressions, respectively obtain context-based word expressions of valid words in the query and context-based word expressions of valid words in said each information domain;

a feature generating module configured to generate matching features corresponding to said each information domain according to the obtained information;

a scoring module configured to determine a matching degree score between the query and the to-be-queried document according to the matching features corresponding to said each information domain.

Further optionally, in the aforesaid apparatus, the expression obtaining module is specifically used to:

respectively embed valid words in the query into a low-dimensional vector, thereby obtaining a sequence Qe=[q1, . . . , qi, . . . , qm];

wherein m represents the number of valid words included in the query, and qi represents the low-dimensional vector of the $i^{th}$ valid word in the query, wherein i is a positive integer and 1≤i≤m;

embed the valid words in said each information domain into a low-dimensional vector respectively to obtain a sequence Te=[t1, . . . , tj, . . . , tn];

wherein n represents the number of valid words included in said each information domain, and tj represents the low-dimensional vector of the $j^{th}$ valid word in the information domain, wherein j is a positive integer and 1≤j≤n.

Further optionally, in the aforesaid apparatus, the expression obtaining module is further specifically used to:

input the Qe into a bi-directional recurrent neural network RNN to respectively obtain an output Q1 after processing in a left-right direction and an output Q2 after processing in a right-left direction;

input the Te into a bi-directional CNN to respectively obtain an output T1 after processing in a left-right direction and an output T2 after processing in a right-left direction;

join the Qe, Q1 and Q2 to obtain Q(m, 3d), wherein d represents an expression dimension, and the embedding and the bi-directional RNNs use the same expression dimension;

join the Te, T1 and T2 to obtain T(n, 3d);

regard a 3d-long vector corresponding to each valid word in the query and said each information domain as a context-based word expression of the valid word.

Further optionally, in the aforesaid apparatus, the feature generating module is specifically configured to:

generate local matching features corresponding to said each information domain according to obtained information;

generate advanced matching features corresponding to said each information domain according to the local matching features.

Further optionally, in the aforesaid apparatus, the feature generating module is specifically configured to:

in each information domain, according to context-based word expressions of valid words and respectively in different matching degree calculating manners, calculate the matching degree between one of valid words in the query and one of valid words in the information domain, to obtain a 3D tensor (m, n, t) corresponding to the information domain;

wherein t represents a t-dimensional vector, t matching degrees are respectively calculated with respect to each group of valid words Q[i] and T[j], the t matching degrees constitute a t-dimensional vector, Q[i] represents valid words in the query, and T[j] represents valid words in the information domain;

each value (i, j, k) in the tensor represents the $k^{th}$ matching degree corresponding to Q[i] and T[j], and 1≤k≤t.

Further optionally, in the aforesaid apparatus, the feature generating module is specifically configured to:

in said each information domain, input the (m, n, t) into the convolutional neural network CNN, and regard obtained output (m, n, t1), . . . (m, n, tw), as the advanced matching features corresponding to the information domain, wherein w is a positive integer and represents the number of convolutional layers in the CNN.

Further optionally, in the aforesaid apparatus, the scoring module is specifically configured to:

in said each information domain, join the (m, n, t) and the corresponding advanced matching features so as to obtain (m, n, t+t1+ . . . +tw);

in said each information domain, determine a (m, k') sequence expression in a manner of pooling as per row with respect to each (m, n) matrix, k' being a positive integer, to obtain (m, (t+t1+ . . . +tw)*k');

join (m, (t+t1+ . . . +tw)*k') in said at least two information domains to obtain (m, (t+t1+ . . . +tw)*k' *p), wherein the p is the number of information domains;

input the (m, (t+t1+ . . . +tw)*k'*p) into the bi-directional RNN to obtain an expression at a final position of the bi-directional RNN;

determine the matching degree score according to the expression at the final position.

Further optionally, in the aforesaid apparatus, the scoring module is specifically configured to: select k' largest values from n values in each row of (m, n), and rank in a descending order, wherein k'≤n.

Further optionally, in the aforesaid apparatus, the expression at the final position is a 2f-long vector, f representing an expression dimension;

the scoring module is specifically configured to input the 2f-long vector into a fully-connected network including a single hidden layer to obtain the output matching degree score.

Further optionally, in the aforesaid apparatus, if the at least two information domains include the content, the valid word obtaining module is specifically configured to obtain the valid words in the content of the to-be-queried document.

Further optionally, in the aforesaid apparatus, the valid word obtaining module is specifically configured to:

perform word segmentation processing for the content to obtain a word sequence formed by a plurality of words arranged in a sequential order in the content;

use a preset window to scan the plurality of words included by the word sequence in a successive order, to obtain a plurality of word segments;

calculate a BM25 score of each word segment and the query;

obtain, from the plurality of word segments, K word segments that have the highest BM25 scores and do not overlap;

regard the words included by the K word segments, as valid words when the information domain is the content.

Further optionally, in the aforesaid apparatus, the valid word obtaining module is specifically configured to:

perform word segmentation processing for the content to obtain a plurality of words arranged in a sequential order in the content;

generate a bi-channel matching matrix according to the valid words in the query and the words in the plurality of words in the content;

input the bi-channel matching matrix into a convolutional neural network CNN, and extract the matching matrix generated by the uppermost layer of CNN;

from the matching matrix generated by the uppermost layer of CNN and by employing a pooling manner, select K positions with the highest scores, no window overlap existing between word segments corresponding to the positions and obtained by division according to a size of the preset window;

regard words included in the word segments in windows corresponding to the K positions, as valid words when the information domain is the content.

Further optionally, in the aforesaid apparatus, the valid word obtaining module is specifically configured to:

precisely compare the valid words in the query with the words in the plurality of words of the content: if they are the same, a matching value at a position corresponding to a precise matching matrix is a weight of an Inverse Document Frequency of the valid words; if they are different, the value is 0 and a m*s-dimensional of precise matching matrix is obtained, wherein m is the number of words of valid words included in the query, and s is the number of the plurality of words included by the content;

embed the valid words in the query and the words in the plurality of words of the content respectively into a low-dimensional vector;

respectively calculate a cosine similarity of the low-dimensional vector of the valid words in the query and low-dimensional vector of the words in the plurality of words, and regard the cosine similarity as a matching value at a corresponding position in a semantic-based matching matrix, to obtain a m*s-dimensional semantic-based matching matrix;

obtain an m*s*2 bi-channel matching matrix according to the m*s-dimensional precise matching matrix and the m*s-dimensional semantic-based matching matrix.

The present disclosure further provides a computer device, comprising:

one or more processors;

a memory for storing one or more programs, the one or more programs, when executed by said one or more processors, enabling said one or more processors to implement the above-mentioned method for evaluating a matching degree of multi-domain information based on artificial intelligence.

The present disclosure further provides a computer readable medium on which a computer program is stored, the program, when executed by a processor, implementing the above-mentioned method for evaluating a matching degree of multi-domain information based on artificial intelligence.

According to the method and apparatus for evaluating a matching degree of multi-domain information based on artificial intelligence, the device and the readable medium of the present disclosure, it is feasible to respectively obtain word expressions of valid words in the query and word expressions of valid words in each information domain in at least two information domains in the to-be-queried document; based on the word expressions, respectively obtain context-based word expressions of valid words in the query and context-based word expressions of valid words in the information domain; generate matching features corresponding to each information domain according to the obtained information; and determine the matching degree score between the query and the to-be-queried document according to the matching features corresponding to each information domain. According to the technical solutions of the present disclosure, it is possible to perform merging for matching signals which are in different information domains of the to-be-queried document and matched with the query, and give more effective play to complementary action of information of different domains and thereby improve the accuracy of the matching of the document and the query upon information retrieval.

DETAILED DESCRIPTION OF PREFERRED EMBODIMENTS

The present disclosure will be described in detail in conjunction with figures and specific embodiments to make objectives, technical solutions and advantages of the present disclosure more apparent.

Figure 1:
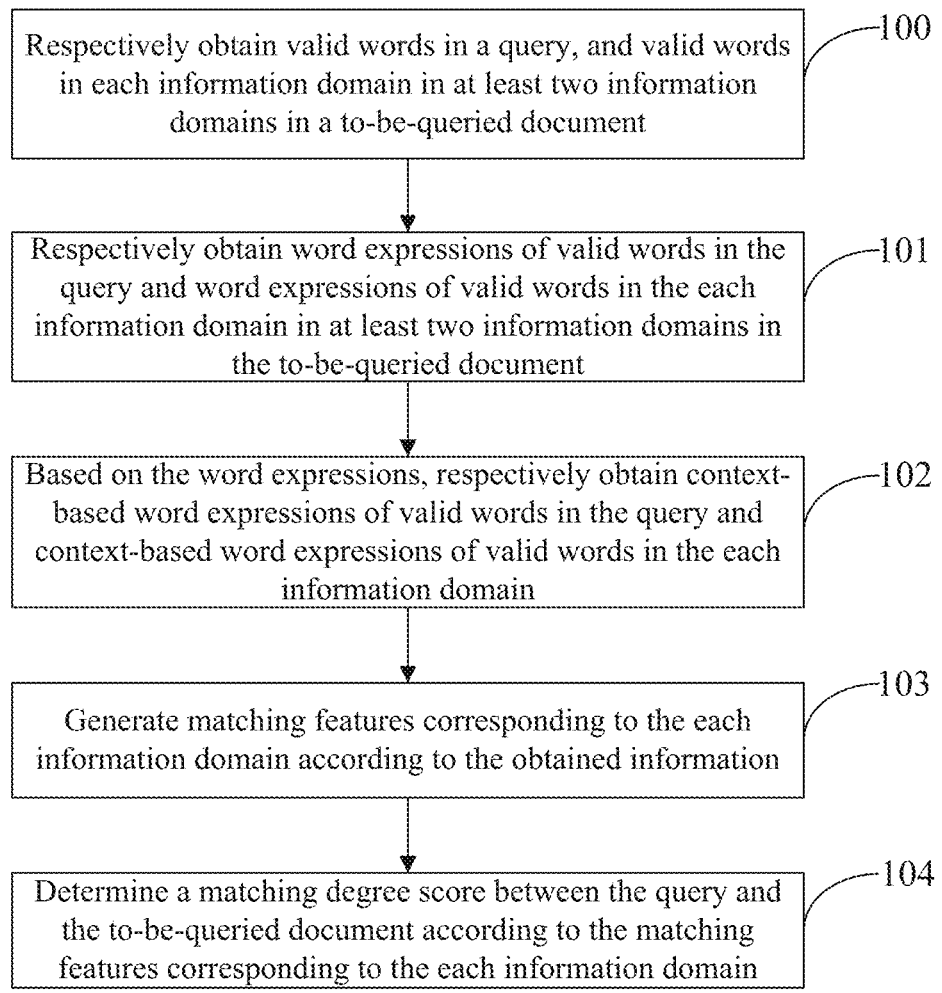
FIG. 1 is a flow chart of an embodiment of a method for evaluating a matching degree of multi-domain information based on artificial intelligence according to the present disclosure.

FIG. 1 is a flow chart of an embodiment of a method for evaluating a matching degree of multi-domain information based on artificial intelligence according to the present disclosure. As shown in FIG. 1, the method for evaluating a matching degree of multi-domain information based on artificial intelligence according to the present embodiment may specifically include the following steps:

100: Respectively obtaining valid words in a query, and valid words in information domains in at least two information domains in a to-be-queried document;

In the present embodiment, specifically it is feasible to perform word segmentation for the query and information domains in at least two information domains in the to-be-queried document, to obtain respective valid words.

After word segmentation is performed for the query, the obtained segmented word of a minimal unit may be called a word. Since text information included by the query is shorter, words included by the query all are valid words participating in the matching degree evaluation in the present embodiment. Upon information retrieval, if the to-be-queried document in the found webpage includes a plurality of information domains such as a title, an abstract and content. The text information included by the title is shorter, and each word after the word segmentation is performed for the title may be regarded as a valid word. Regarding long-text information such as the abstract and the content, it is also possible to regard each word obtained after performing word segmentation for the abstract or content as a valid word. However, if each word obtained after performing word segmentation for the abstract or content is regarded as a valid word, this will cause substantial computing workload and a very complicated computing process. Hence, in the present embodiment, it is feasible to select, from the abstract or content, partial words that can represent the corresponding long text as valid words, which will participate in matching degree evaluation. In the present embodiment, valid words in at least two information domains may be selected for participation in the matching degree evaluation. The at least two information domains may include at least two of the title, the abstract and the content. Since the content includes the richest content, preferably the at least two information domains may at least include the title and the content.

Preferably, when the at least two information domains include the content, obtaining valid words in the content of the to-be-queried document in step 100 may specifically include the following two manners:

The first manner may specifically include the following steps:

(a1) perform word segmentation processing for the content to obtain a word sequence formed by a plurality of words arranged in a sequential order in the content;

(a2) use a preset window to scan the plurality of words included by the word sequence in a successive order, to obtain a plurality of word segments;

(a3) calculate a BM25 score of each word segment and the query;

(a4) obtain, from the plurality of word segments, K word segments that have the highest BM25 scores and do not overlap;

(a5) regard words included by the K word segments, as valid words when the information domain is the content.

BM25 is a classic search method based on keywords and requires an extremely little computing quantity as compared with the complicated deep learning model. In the present embodiment, it is feasible to first perform word segmentation processing for the text information in the content without performing any filtration processing, each word after the word segment being retained, thereby obtain a plurality of words, then arrange the plurality of words obtained after the word segmentation in a sequential order in the content to form a word sequence, then use a preset window of a fixed size to scan the plurality of words included by the word sequence in a successive order, upon scanning use the preset window to choose a word segment from the plurality of words included by the word sequence as the word segment of the scanning of this time, then move the preset window from front to back to perform scanning next time and obtain next word segment, scan in the same way until the scanning proceeds to the end of the word sequence, thereby obtaining a plurality of word segments. During scanning, the size of each word segment obtained from the scanning is consistent with the size of the preset window, and the word segment may include a plurality of words. Regarding each word segment obtained from the scanning, it is feasible to calculate the BM25 score of the word segment and the query, and after BM25 scores of all word segments are calculated, select top K word segments that have the highest BM25 scores and do not window overlap by employing greedy algorithm. The words in the windows of the K word segments are joined together with a special symbol in between. A valid word sequence formed by joining K word segments is content segments where the webpage content is best matched with the query. The words after the joining, namely, words included by K word segments, are regarded as all valid words when the information domain is the content.

The second manner may specifically include the following steps:

(b1) perform word segmentation processing for the content to obtain a plurality of words arranged in a sequential order in the content;

In the present embodiment, after word segmentation processing is performed for the text information in the content, no filtration processing may be performed, and each word after word segmentation is retained. The plurality of words corresponding to the content are arranged in the sequential order in the content.

(b2) generate a bi-channel matching matrix according to valid words in the query and words in the plurality of words in the content;

The manner of obtaining valid words in the query is the same as the step 100 in the above embodiment and will not be detailed herein. Reference may be made to relevant depictions of the above embodiment for details.

The step (b2) may specifically include the following steps:

(c1) precisely compare valid words in the query with words in the plurality of words of the content: if they are the same, a matching value at a position corresponding to a precise matching matrix is a weight of an Inverse Document Frequency (IDF) of the valid words; if they are different, the value is 0 and a m*s-dimensional of precise matching matrix is obtained, wherein m is the number of words of valid words included in the query, and s is the number of the plurality of words included by the content;

(c2) embed valid words in the query and words in the plurality of words of the content respectively into a low-dimensional vector; for details, please refer to the disclosure of the above embodiments and detailed description is not provided herein any more.

(c3) respectively calculate a cosine similarity of the low-dimensional vector of valid words in the query and low-dimensional vector of words in the plurality of words, and regard it as a matching value at a corresponding position in a semantic-based matching matrix, to obtain a m*s-dimensional semantic-based matching matrix;

(c4) obtain a m*s*2 bi-channel matching matrix according to the m*s-dimensional precise matching matrix and the m*s-dimensional semantic-based matching matrix.

(b3) input the bi-channel matching matrix into a convolutional neural network CNN, and extract the matching matrix generated by the uppermost layer of CNN;

(b4) from the matching matrix generated by the uppermost layer of CNN and by employing a pooling manner, selecting K positions with the highest scores, no window overlap existing between word segments corresponding to the positions and obtained by division according to the size of the preset window;

(b5) regard words included in the word segments in windows corresponding to K positions, as valid words when the information domain is the content.

BM25 in the first manner is a matching method based on keyword precise matching. A drawback of this method is failure to build a model for a similarity degree between semantics, so the extracted information is not precise enough. To solve this problem, the present embodiment provides a content extracting method based on deep learning. To ensure efficiency, this step employs a cost-effective deep learning model with a small computing quantity.

For example, first a matching matrix is built for the query and the content. This matching matrix includes two types: one type is a matching matrix based on keyword precise matching, as obtained from the above step (c1). The other type is a semantic-based matching matrix, as obtained from the above step (c3). The semantic-based matching matrix is built in the following specific manner: regarding a word pair formed by the query and each word in the content, using their low-dimensional vectors after the embedding to calculate cosine similarity. After two matching matrices are obtained, a 2-dimensional CNN (similar to a CNN in images) may be further used to extract advanced matching features (N-Gram features). Reference may be made to relevant depictions in the above embodiments for the extracting manner. For example, in the present embodiment two-four-layered CNN may be used to extract advanced matching features, and choose the matching matrix generated by the uppermost layer of CNN.

Figure 4:
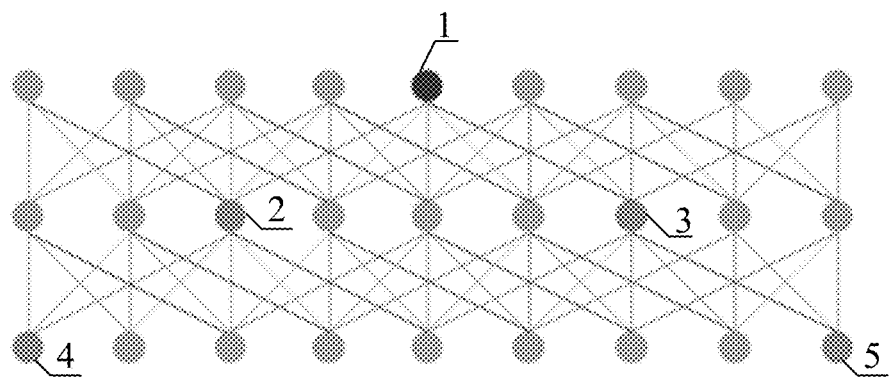
FIG. 4 is a schematic diagram of a process of processing CNN in an embodiment of the present disclosure.

In addition, to ensure that an output channel of the CNN at the uppermost layer is 1, only one matching matrix (m, s) is output to ensure that only one value is generated at each final position, and this value represents a matching degree between those words that can be covered by the layered CNN with the position as a center, and the query. For example, take a two-layered CNN as an example. IF the preset window of the first layer of the CNN is (5, 5), and the preset window of the second layer is also (5, 5), an area with a length 9 can be actually covered at a (i, j) position on the matching matrix produced by the second layer of CNN. As shown in FIG. 4 below which illustrate a schematic diagram of a process of processing CNN in an embodiment of the present disclosure, wherein point 1 covers all words between two points 2 and 3 in an intermediate layer through one layer of convolution, and covers all words between two points 4 and 5 in the lowermost layer through two layers of convolution. It can be seen that the value corresponding to the point 1 considers matching scores of all words in the window. That is, the position of point 1 covers an area of nine words.

Then, K positions with the highest scores are selected by top kpooling on the matching matrix generated by the uppermost layer of CNN, and there is no window overlap between word segments corresponding to the positions and obtained by dividing according to a size of a preset window. A specific selecting manner is first selecting the largest position for example (i1, j1), wherein j1 corresponds to the end of the content, and then the window can cover [j1−4, j1+4] of the content, and then selecting the second, and the third. No overlap means that after j1 is selected, (i2,j2) obtained when j2 is selected corresponds to the window [j2−4,j2+4], whereupon it must be required not to overlap [j1−4,j1+4]. After K positions are selected, each position corresponds to one window, and all words in word segments in K windows are joined together to obtain valid words of the content.

It can be seen that the CNN is advantageous in that it can consider sematic-level matching on the one hand, and on the other hand that it can model an advanced matching mode such as N-gram. Points finally selected by top kpooling are best matched positions. Due to action of multi-layer convolutional window, the matching features of the positions merge matching information of all words covered by the whole window, so text information can be matched more precisely. In addition, CNN can easily operate in parallel, and require less computing workload and less time for computing as compared with the complicated deep learning algorithm employed upon generating advanced matching features corresponding to information domains in the above embodiments.

101: respectively obtain word expressions of valid words in the query and word expressions of valid words in each information domain in at least two information domains in the to-be-queried document;

Specifically, in step 101, it is feasible to respectively embed valid words in the query into a low-dimensional vector, thereby obtaining a sequence Qe=[q1, . . . qi, . . . , qm].

Wherein m represents the number of valid words included in the query, and qi represents the low-dimensional vector of the $i^{th}$ valid word in the query, wherein i is a positive integer and $1 \leq i \leq m$.

In addition, valid words in each information domain may be embedded into low-dimensional vectors respectively to obtain a sequence Te=[t1, . . . , tj, . . . , tn];

Wherein n represents the number of valid words included in each information domain, and tj represents the low-dimensional vector of the $j^{th}$ valid word in the information domain, wherein j is a positive integer and $1 \leq j \leq n$.

For example, in the information domain title, it is feasible to embed words in the title into a low-dimensional vector respectively, thereby obtaining a sequence Te=[t1, . . . , tj, . . . , tn]. Valid words in other information domains are processed in the same manner, and detailed description is not presented here any more.

In practical application, it is necessary to perform preprocessing such as word segmentation for the query and information domains in at least two information domains, and thereby obtain the valid words of the query and the plurality of words included in the information domains.

Take the query as an example. Assuming that it includes a total of four words: word 1, word 2, word 3 and word 4 respectively, and the four words all are valid words, it is feasible to respectively embed valid word 1, valid word 2, valid word 3 and valid 4 into a low-dimensional vector respectively, thereby obtaining Qe=[q1,q2, q3, q4]. How to obtain the low-dimensional vectors are of the prior art.

As far as the title as the information domain is concerned, reference may be made to a manner of obtaining valid words with respect to the query. As for the information domain abstract or content, it is necessary to first perform preprocessing such as word segmentation to obtain the plurality of words, then obtain desired valid words based on the plurality of words, and subsequent implementation will not be detailed any more.

102: based on the word expressions, respectively obtain context-based word expressions of valid words in the query and context-based word expressions of valid words in the information domain.

It is feasible to, after respectively obtaining word expressions of valid words in the query and word expressions of valid words in information domain, further obtain context-based word expressions of valid words in the query and context-based word expressions of valid words in the information domain.

For example, it is feasible to input Qe obtained in the above embodiment into a bi-directional RNN to respectively obtain an output Q1 after processing in a left-right direction and an output Q2 after processing in a right-left direction, and input Te into a bi-directional CNN to respectively obtain an output T1 after processing in a left-right direction and an output T2 after processing in a right-left direction.

That is, Qe and Te are respectively input into different bi-directional RRNs to obtain Q1 and Q2 and T1 and T2 respectively.

The embedding and the bi-directional RNNs may use the same expression dimension d. A specific value of d may depend on actual needs. Hence, the size of Qe, Q1 and Q2 is (m, d) and correspondingly the size of Te, T1 and T2 is (n, d).

It is possible to join Qe, Q1 and Q2 to obtain Q(m, 3d), and join Te, T1 and T2 to obtain T(n, 3d). As such, each valid word in the query and all information domains corresponds to a 3d-long vector which is the context-based word expression.

It can be seen that the joining in the present embodiment refers to joining as per column.

As far as the 3d-long vector corresponding to each word is concerned, the front d dimensions represent an embedding result of the word, the intermediate d dimensions represent a left context of the word, and the last d dimensions represent a right context of the word. Hence, the 3d-long vector is a context-based word expression including the context information of the word.

103: generate matching features corresponding to each information domain according to obtained information;

It is feasible to first generate local matching features corresponding to each information domain according to obtained information, and then further generate advanced matching features corresponding to each information domain according to the local matching features. Detailed description will be presented for the manner of obtaining the local matching features and the advanced matching features respectively.

1) Local Matching Features

That is, matching is performed based on previously-obtained expressions to obtain all local matching features in each information domain.

Specifically, it is feasible to, in each information domain, according to context-based word expressions of valid words and respectively in different matching degree calculating manners, calculate the matching degree between one of valid words in the query and one of valid words in the information domain, to obtain a 3D tensor (m, n, t) corresponding to the information domain;

Wherein t represents a t-dimensional vector, t matching degrees are respectively calculated with respect to each group of valid words Q[i] and T[j], the t matching degrees constitute a t-dimensional vector, Q[i] represents valid words in the query, and T[j] represents valid words in the current information domain.

Each value (i, j, k) in the tensor represents the $k^{th}$ matching degree corresponding to Q[i] and T[j], and 1≤k≤t.

For example, take the information domain title as an example. It is feasible to, according to context-based word expressions of words and respectively in different matching degree calculating manners, calculate a matching degree between one of words in the query and one of words in the title, thereby obtaining a 3D tensor (m, n, t).

In each information domain, take an example to illustrate:

Assume that the query includes a total of two valid words: valid word 1 and valid word 2 respectively, and the title also includes two valid words: valid word 3 and valid word 4 respectively;

t matching degrees are calculated in different matching degree calculating manners with respect to valid word 1 and valid word 3 respectively;

t matching degrees are calculated in different matching degree calculating manners with respect to valid word 1 and valid word 4 respectively;

t matching degrees are calculated in different matching degree calculating manners with respect to valid word 2 and valid word 3 respectively;

t matching degrees are calculated in different matching degree calculating manners with respect to valid word 2 and valid word 4 respectively.

Wherein the matching degree between two valid words is calculated according to context-based word expressions of two valid words.

Specific matching degree calculating manners may be employed depending on actual needs, for example, may include various matching degree calculating manners such as a tensor neural network and cosine.

The title is taken as an information domain above. In practical application, if the information domain is abstract or content, particularly when the information domain is the content, the number of valid words is much larger than the number of valid words when the information domain is the title. The remaining processing manner is the same as the above embodiment and will not be detailed any longer here.

In addition, different matching matrixes may be constructed in a conventional keyword-based matching manner to facilitate fusion of artificial knowledge, namely, people may construct extra matching matrixes as matching features according to knowledge so as to provide an excellent channel for introducing artificial knowledge into a scenario such as information retrieval.

2) Advanced Matching Feature

In each information domain, what are contained in the obtained tensor (m, n, t) are word levels and context-based word-level matching features. On this basis, it is possible to further use the CNN to extract high-dimensional features of each information domain.

As in an image, m and n are the size of the image, and t is the number of feature maps.

In each information domain, (m, n, t) may be input into the CNN to obtain output (m, n, t1), . . . (m, n, tw), as advanced matching features corresponding to the information domain, wherein w is a positive integer and represents the number of the convolutional layers in the CNN.

Assume that the number of conventional layers is 1, after (m, n, t) is input into the CNN, (m, n, t1) can be obtained, wherein t1 is the number of kernels of the CNN. In practical application, input and output of the convolution can be made the same in size in a dynamic padding manner.

Furthermore, it is further feasible to stack a plurality of conventional layers to extract higher-level matching features.

104: determine the matching degree score between the query and the to-be-queried document according to the matching features corresponding to each information domain.

First, in each information domain, it is feasible to join (m, n, t) and the obtained advanced matching features so as to obtain (m, n, t+t1+ . . . +tw), and if the number of convolutional layers is 2, only join (m, n, t), (m, n, t1) and (m, n, t2) as (m, n, t+t1+t2), that is, t+t1+t2 matching matrixes with the size (m, n).

In each information domain, a (m, k') sequence expression may be determined in a manner of pooling as per row with respect to each (m, n) matching matrix, k' being a positive integer, to obtain (m, (t+t1+ . . . +tw)*k').

For example, it is feasible to select k' largest values from n values in each row of (m, n), and rank in a descending order to obtain (m, k'), wherein k'≤n. Assume that there are a total of t+t1+t2 matching matrixes, the obtained output is (m, (t+t1+t2)*k'). The pooling manner may further be an averaging manner or other mathematic manners, and will not be listed one by one here.

An intuitive meaning of the above process is finding a maximum (t+t1+t2)*k' features from the matching features corresponding to each valid word in the query. Each valid word in the query is very important and used to clearly describe the user's information needs. These features indicate situations that the information domain satisfies various information needs in the query.

Then, join (m, (t+t1+ . . . +tw)*k') of at least two information domains to obtain (m, (t+t1+ . . . +tw)*k'*p), wherein p is the number of information domains; the join here is also joining as per column.

Each row in the matrix (m, (t+t1+ . . . +tw)*k'*p) after the joining contains the situations that information of different information domains satisfies the keywords in the row in the query.

This manner is merging matching information of different information domains at each keyword level of the query, and the merging in the present embodiment is closer to the bottom layer of the model as compared with the manner of simply employing final scores of multiple information domains to perform weighted averaging and merging. The manner is advantageous in giving full play to complementary action of information of different information domains. For example, if the user's query is (A, B, C), the title of document 1 includes (A, B) and the content also includes (A, B), whereas the title of document 2 includes (A, B) and the content includes (C), it is obviously that document 2 can meet the query demand better. This merging manner can effectively distinguish such cases during the merging process of RNN.

It can be known from the above manner that the final best match occurs at which specific position (i, j) in the (m, n) matching matrix, so it can be seen that each valid word in the query is matched with which valid word in each information domain, and the manner shows a very strong interpretability.

The (m, (t+t1+ . . . +tw)*k'*p) obtained above is a sequence that becomes longer, finally a bi-directional RNN manner may be employed to merge the information of the sequence, and the expression on the final position of the bi-directional RNN may be regarded as an expression after the merging.

That is, the (m, (t+t1+ . . . +tw)*k'*p) is input into the bi-directional RNN to obtain the expression at the final position of the bi-directional RNN, and then the matching degree score between the query and the title may be determined according to the expression at the final position.

The expression at the final position may be a 2f-long vector, wherein f represents an expression dimension and its specific value may depend on actual needs. Since the RNN is a bi-directional RNN, an f-long vector may be obtained in each direction, and the two f-long vectors may be combined to form the 2f-long vector.

Finally, the 2f-long vector may be input into a fully-connected network including a single hidden layer, thereby obtaining the output matching degree score between the query and the to-be-queried document.

In the scenario of the information retrieval, after the matching degree scores between the user-input query and the to-be-queried documents are respectively calculated, it is feasible to rank the to-be-queried documents in a descending order of the scores, and thereby return top N to-be-queried documents after the ranking to the user as a retrieval result, wherein N is a positive integer.

Figure 2:
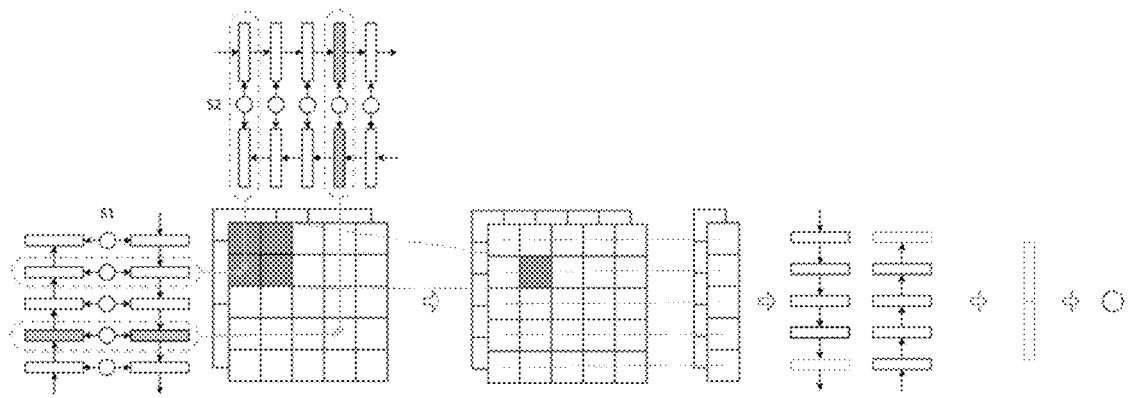
FIG. 2 is a schematic diagram of a process of obtaining a matching degree score between a query and a title according to the present disclosure.

To summarize the above introduction, when the information domain is the title, FIG. 2 is a schematic diagram of a process of obtaining a matching degree score between a query and a title according to the present disclosure. A specific implementation will not be detailed any more here, and reference may be made to the above relevant depictions.

It can be seen that the solution of the above embodiment is employed to construct the word expressions of the bottom layer and context-based word expressions. These expressions can emphasize local information as well as merging global information, thereby better reflecting the matching degree between the query and the title and improving the accuracy of the evaluation result. In the present embodiment, when the information domain is the title, it is feasible to only take out the matching features corresponding to the title, and it is unnecessary to individually calculate the matching degree score between the information domain title and the query.

Furthermore, according to the solution of the present embodiment, all local key matching features can be retained very well, and it is further feasible to, based on these local matching features, extract advanced matching features, thereby effectively capturing the sematic matching and matching proximity information that are crucial to information retrieval.

In addition, after the matching features are obtained, pooling is performed for each word in the query to build a model to reflect the title's coverage of the query's demands for all key information. Since all matching matrixes obtained in the middle participate in the pooling of this time, the finally-obtained result is the situation that information demands of words on a plurality of levels are covered, and has an excellent interpretability. Which word in the title satisfied each word in the query can be traced back based on the pooling result. The above manner may be employed to calculate matching features when the information domain is the title, the abstract or the content.

Figure 3:
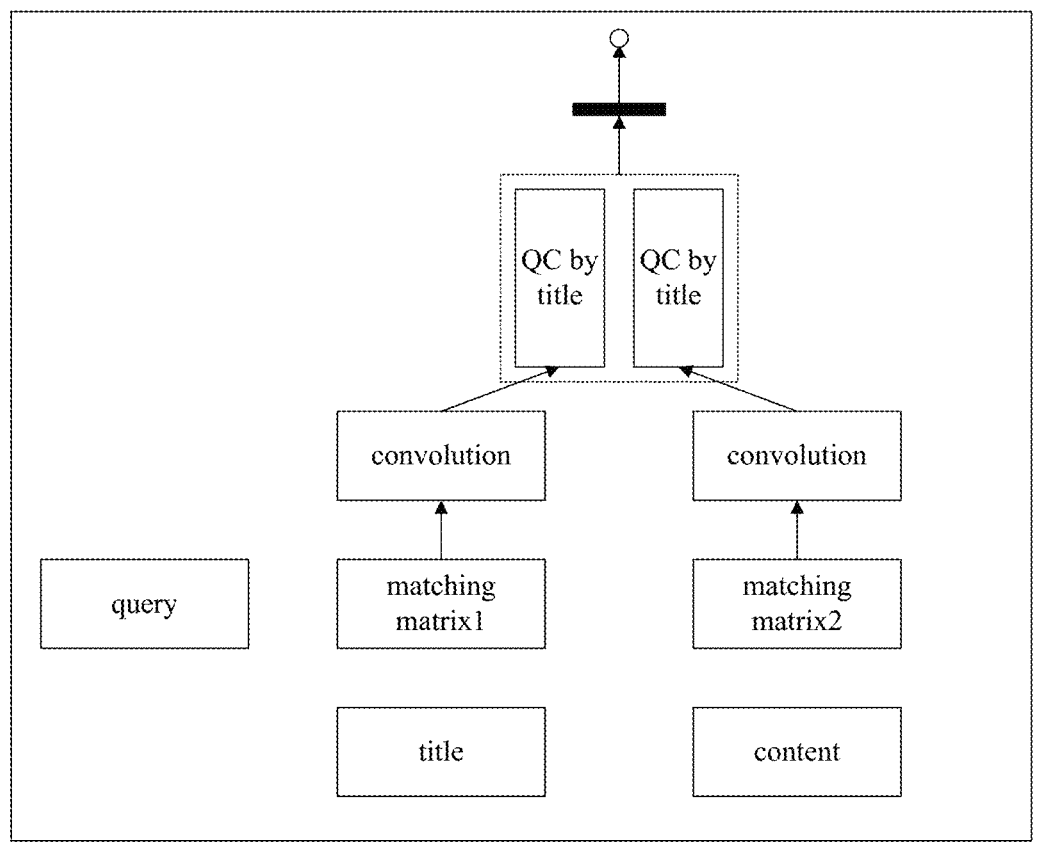
FIG. 3 is a schematic diagram of a process of obtaining a matching degree score between a query and a document including two information domains title and content according to the present disclosure.

By considering the above introduction and by taking the merge of the information domain the title and the content as an example, FIG. 3 is a schematic diagram of a process of obtaining a matching degree score between a query and a document including two information domains title and content according to the present disclosure. A rough process is as follows: first, respectively obtain corresponding all local matching features matching matrix1 and matching matrix2 in the information domains title and content, and then respectively employ convolution processing of the CNN to respectively obtain the matching features of information domains, namely, obtain a scope of query coverage (QC) of the query in the information domains, then perform merging processing for the matching features of the information domains, and determine the matching degree score between the query and the to-be-queried document. A specific implementation will not be detailed any more here, and reference may be made to the above relevant depictions.

The method for evaluating a matching degree of multi-domain information based on artificial intelligence, by employing the above technical solution, may overcome the technical problem of undesirable accuracy of determining whether the document is matched with the query only according to the matching degree score between the query and the title in the prior art. In the present embodiment is provided a deep matching model based on multi-information domain coverage of query keywords. The model may extract local and global matching features at multiple levels, perform merging for matching signals which are in different information domains of the to-be-queried document and matched with the query, and may give more effective play to complementary action of information of different domains and thereby improve the matching accuracy of the document and the query upon information retrieval.

Furthermore, the present embodiment may further overcome the problem about failure to process too long content in the prior art, and provides a method of extracting content key information based on the query to process input data of the deep model. Specifically, it is feasible to find several key segments best matched with the query from a very long webpage content, and reduce the calculating price.

Figure 5:
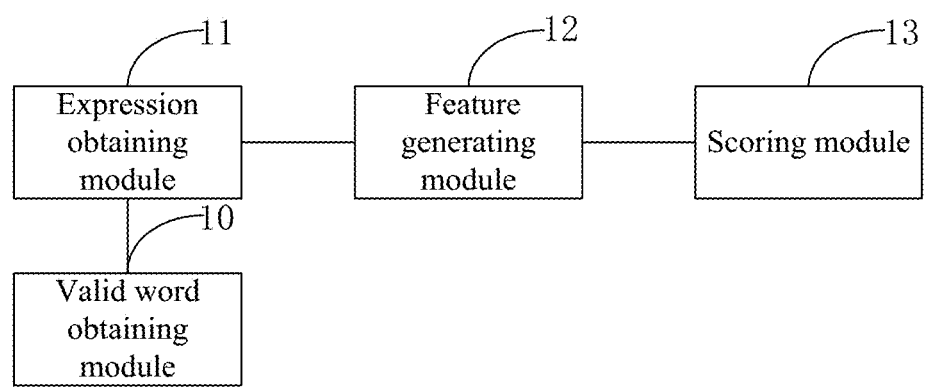
FIG. 5 is a block diagram of an embodiment of an apparatus for evaluating a matching degree of multi-domain information based on artificial intelligence according to the present disclosure.

FIG. 5 is a block diagram of an embodiment of an apparatus for evaluating a matching degree of multi-domain information based on artificial intelligence according to the present disclosure. As shown in FIG. 5, the apparatus for evaluating a matching degree of multi-domain information based on artificial intelligence according to the present embodiment may specifically include: a valid word obtaining module 10, an expression obtaining module 11, a feature generating module 12 and an evaluating module 13.

The valid word obtaining module 10 is configured to respectively obtain valid words in a query, and valid words in information domains in at least two information domains in a to-be-queried document;

The expression obtaining module 11 is configured to respectively obtain word expressions of valid words in the query and word expressions of valid words in each information domain in at least two information domains in the to-be-queried document;

The expression obtaining module 11 is further configured to, based on the word expressions, respectively obtain context-based word expressions of valid words in the query and context-based word expressions of valid words in the information domain;

The feature generating module 12 is configured to generate matching features corresponding to each information domain according to the information obtained by the expression obtaining module 11;

The scoring module 13 is configured to determine the matching degree score between the query and the to-be-queried document according to the matching features corresponding to each information domain obtained by the feature generating module 12.

Principles employed by the apparatus for evaluating a matching degree of multi-domain information based on artificial intelligence according to the present embodiment with the above modules to achieve evaluation of the matching degree of multi-domain information based on artificial intelligence and the resultant technical effects are the same as those of the above-mentioned method embodiments. For particulars, please refer to the depictions of the aforesaid relevant method embodiments, and no detailed depictions will be presented here.

Further optionally, in the apparatus of the above embodiment, the expression obtaining module 11 is specifically used to:

respectively embed valid words in the query into a low-dimensional vector, thereby obtaining a sequence Qe=[q1, . . . , qi, . . . , qm];

wherein m represents the number of valid words included in the query, and qi represents the low-dimensional vector of the $i^{th}$ valid word in the query, wherein i is a positive integer and $1 \leq i \leq m$;

embed valid words in each information domain into low-dimensional vectors respectively to obtain a sequence Te=[t1, . . . , tj, . . . , tn];

wherein n represents the number of valid words included in each information domain, and tj represents the low-dimensional vector of the $j^{th}$ valid word in the information domain, wherein j is a positive integer and $1 \leq j \leq n$.

Further optionally, in the apparatus of the above embodiment, the expression obtaining module 11 is specifically used to:

input Qe into a bi-directional recurrent neural network RNN to respectively obtain an output Q1 after processing in a left-right direction and an output Q2 after processing in a right-left direction;

input Te into the bi-directional CNN to respectively obtain an output T1 after processing in a left-right direction and an output T2 after processing in a right-left direction;

join Qe, Q1 and Q2 to obtain Q(m, 3d), wherein d represents an expression dimension, and the embedding and the bi-directional RNNs use the same expression dimension;

join Te, T1 and T2 to obtain T(n, 3d);

regard a 3d-long vector corresponding to each valid word in the query and each information domain as a context-based word expression of the valid word.

Further optionally, in the apparatus of the above embodiment, the feature generating module 12 is specifically configured to:

generate local matching features corresponding to each information domain according to obtained information;

generate advanced matching features corresponding to each information domain according to the local matching features.

Further optionally, in the apparatus of the above embodiment, the feature generating module 12 is specifically configured to:

in each information domain, according to context-based word expressions of valid words and respectively in different matching degree calculating manners, calculate the matching degree between one of valid words in the query and one of valid words in the information domain, to obtain a 3D tensor (m, n, t) corresponding to the information domain;

wherein t represents a t-dimensional vector, t matching degrees are respectively calculated with respect to each group of valid words Q[i] and T[j], the t matching degrees constitute a t-dimensional vector, Q[i] represents valid words in the query, and T[j] represents valid words in the information domain;

each value (i, j, k) in the tensor represents the $k^{th}$ matching degree corresponding to Q[i] and T[j], and $1 \leq k \leq t$.

Further optionally, in the apparatus of the above embodiment, the feature generating module 12 is specifically configured to:

in each information domain, input (m, n, t) into the convolutional neural network CNN to obtain output (m, n, t1), . . . (m, n, tw), as advanced matching features corresponding to the information domain, wherein w is a positive integer and represents the number of the convolutional layers in the CNN.

Further optionally, in the apparatus of the above embodiment, the scoring module 13 is specifically configured to:

in each information domain, join (m, n, t) and the corresponding advanced matching features so as to obtain (m, n, t+t1+ . . . +tw);

in each information domain, determine a (m, k') sequence expression in a manner of pooling as per row with respect to each (m, n) matrix, k' being a positive integer, to obtain (m, (t+t1+ . . . +tw)*k');

join (m, (t+t1+ . . . +tw)*k') in at least two information domains to obtain (m, (t+t1+ . . . +tw)*k' *p), wherein p is the number of information domains;

input the (m, (t+t1+ . . . +tw)*k'*p) into the bi-directional RNN to obtain an expression at a final position of the bi-directional RNN;

determine the matching degree score according to the expression at the final position.

Further optionally, in the apparatus of the above embodiment, the scoring module 13 is specifically configured to: select k' largest values from n values in each row of (m, n), and rank in a descending order, wherein k'≤n.

Further optionally, in the apparatus of the above embodiment, the expression at the final position is a 2f-long vector, wherein f represents an expression dimension;

the scoring module 13 is specifically configured to: input the 2f-long vector into a fully-connected network including a single hidden layer to obtain the output matching degree score.

Further optionally, when the at least two information domains include the content, the valid word obtaining module 10 of the present embodiment is configured to obtain valid words in the content of the to-be-queried document.

Further optionally, in the apparatus of the above embodiment, the valid word obtaining module 10 is specifically configured to:

perform word segmentation processing for the content to obtain a word sequence formed by a plurality of words arranged in a sequential order in the content;

use a preset window to scan a plurality of words included by the word sequence in a successive order, to obtain a plurality of word segments;

calculate a BM25 score of each word segment and the query;

obtain, from the plurality of word segments, K word segments that have the highest BM25 scores and do not overlap;

regard words included by the K word segments, as valid words when the information domain is the content.

Alternatively, further optionally, in the apparatus of the above embodiment, the valid word obtaining module 10 is specifically configured to:

perform word segmentation processing for the content to obtain a plurality of words arranged in a sequential order in the content;

generate a bi-channel matching matrix according to valid words in the query and words in the plurality of words in the content;

input the bi-channel matching matrix into a convolutional neural network CNN, and extract the matching matrix generated by the uppermost layer of CNN;

from the matching matrix generated by the uppermost layer of CNN and by employing a pooling manner, select K positions with the highest scores, no window overlap existing between word segments corresponding to the positions and obtained by division according to the size of the preset window;

regard words included in the word segments in windows corresponding to K positions, as valid words when the information domain is the content.

Further optionally, in the apparatus of the above embodiment, the valid word obtaining module 10 is specifically configured to:

precisely compare valid words in the query with words in the plurality of words of the content: if they are the same, a matching value at a position corresponding to a precise matching matrix is a weight of an Inverse Document Frequency of the valid words; if they are different, the value is 0 and a m*s-dimensional of precise matching matrix is obtained, wherein m is the number of words of valid words included in the query, and s is the number of the plurality of words included by the content;

embed valid words in the query and words in the plurality of words of the content respectively into a low-dimensional vector;

respectively calculate a cosine similarity of the low-dimensional vector of valid words in the query and low-dimensional vector of words in the plurality of words, and regard it as a matching value at a corresponding position in a semantic-based matching matrix, to obtain a m*s-dimensional semantic-based matching matrix;

obtain an m*s*2 bi-channel matching matrix according to the m*s-dimensional precise matching matrix and the m*s-dimensional semantic-based matching matrix.

Principles employed by the apparatus for evaluating a matching degree of multi-domain information based on artificial intelligence according to the present embodiment with the above modules to achieve evaluation of the matching degree of multi-domain information based on artificial intelligence and the resultant technical effects are the same as those of the above-mentioned method embodiments. For particulars, please refer to the depictions of the aforesaid relevant method embodiments, and no detailed depictions will be presented here.

Figure 6:
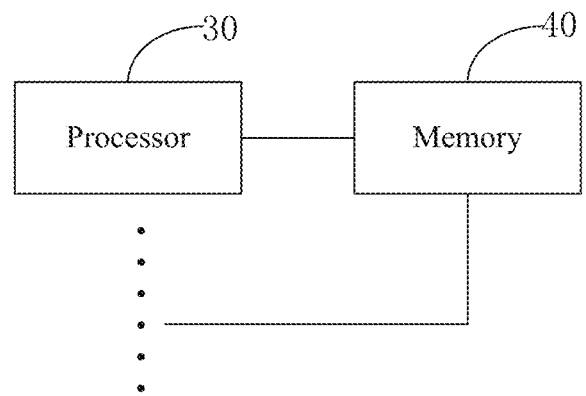
FIG. 6 is a structural diagram of an embodiment of a computer device according to the present disclosure.

FIG. 6 is a structural diagram of an embodiment of a computer device according to the present disclosure. As shown in FIG. 6, the computer device according to the present embodiment comprises: one or more processors 30, and a memory 40 for storing one or more programs, wherein the one or more programs stored in the memory 40, when executed by said one or more processors 30, enabling said one or more processors 30 to implement the method of evaluating a matching degree of multi-domain information based on artificial intelligence of the embodiments as shown in FIG. 1-FIG. 4. The embodiment shown in FIG. 6 exemplarily includes a plurality of processors 30.

Figure 7:
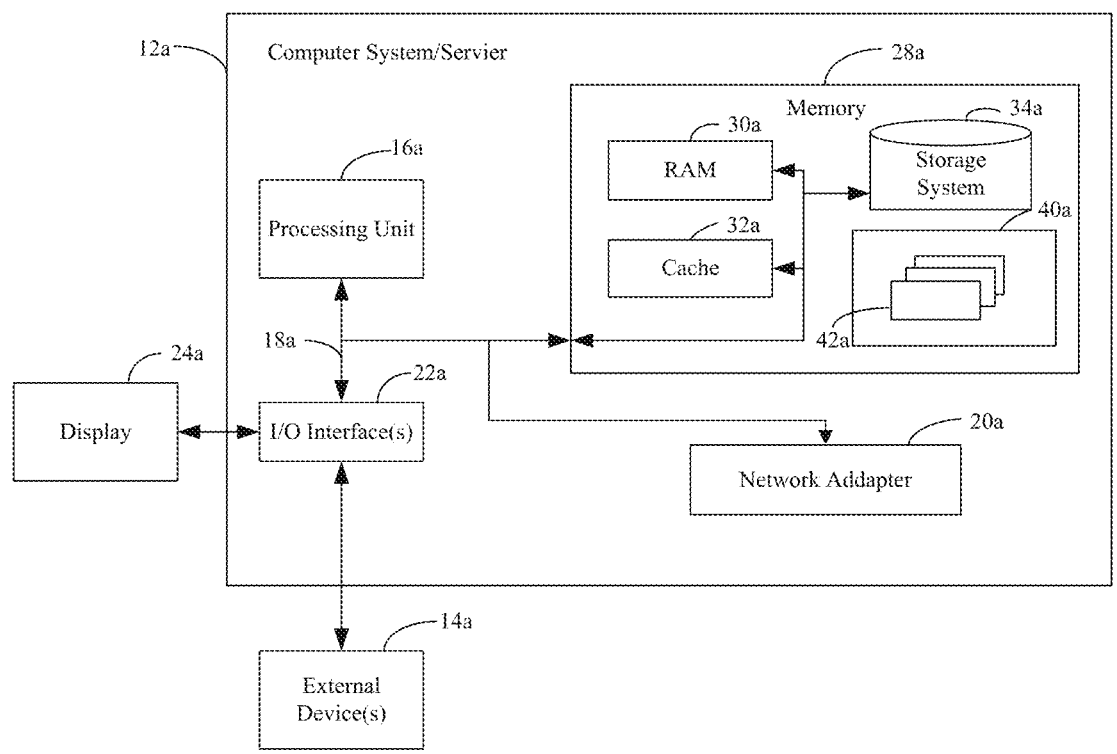
FIG. 7 is an example diagram of a computer device according to the present disclosure.

For example, FIG. 7 is an example diagram of a computer device according to the present disclosure. FIG. 7 shows a block diagram of an example computer device 12a adapted to implement an implementation mode of the present disclosure. The computer device 12a shown in FIG. 7 is only an example and should not bring about any limitation to the function and scope of use of the embodiments of the present disclosure.

As shown in FIG. 7, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 7 and typically called a "hard drive"). Although not shown in FIG. 7, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1-FIG. 5 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 5 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 7, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the method of evaluating a matching degree of multi-domain information based on artificial intelligence as shown in the above embodiments.

The present disclosure further provides a computer readable medium on which a computer program is stored, the program, when executed by a processor, implementing the method of evaluating a matching degree of multi-domain information based on artificial intelligence shown in the above embodiments.

The computer readable medium of the present embodiment may include RAM 30a, and/or cache memory 32a and/or a storage system 34a in the system memory 28a in the embodiment shown in FIG. 7.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for evaluating a matching degree of multi-domain information based on artificial intelligence, wherein the method comprises:
    respectively obtaining words in a query, and words in each information domain in at least two information domains in a to-be-queried document;
    respectively obtaining word expressions of words in the query and word expressions of words in each information domain in at least two information domains in the to-be-queried document;
    based on the word expressions, respectively obtaining context-based word expressions of words in the query and context-based word expressions of words in the each information domain;
    generating matching features corresponding to the each information domain according to obtained information;
    determining a matching degree score between the query and the to-be-queried document according to the matching features corresponding to the each information domain,
    wherein the respectively obtaining word expressions of words in the query and word expressions of words in each information domain in at least two information domains in the to-be-queried document comprises:
    respectively embedding words in the query into a low-dimensional vector, thereby obtaining a sequence Qe=[q1, . . . , qi, . . . , qm];
    wherein m represents the number of words included in the query, and qi represents the low-dimensional vector of the $i^{th}$ word in the query, wherein i is a positive integer and $1 \leq i \leq m$;
    respectively embedding words in the each information domain into a low-dimensional vector to obtain a sequence Te=[t1, . . . , tj, . . . , tn];
    wherein n represents the number of words included in each information domain, and tj represents the low-dimensional vector of the $j^{th}$ word in the information domain, wherein j is a positive integer and $1 \leq j \leq n$,
    wherein the respectively obtaining context-based word expressions of words in the query and context-based word expressions of words in each information domain comprises:
    inputting the Qe into a bi-directional recurrent neural network RNN to respectively obtain an output Q1 after processing in a left-right direction and an output Q2 after processing in a right-left direction;
    inputting the Te into a bi-directional CNN to respectively obtain an output T1 after processing in a left-right direction and an output T2 after processing in a right-left direction;
    joining the Qe, Q1 and Q2 to obtain a sequence Q(m, 3d), wherein d represents an expression dimension, and the embedding and the bi-directional RNNs use the same expression dimension;
    joining the Te, T1 and T2 to obtain a sequence T(n, 3d);
    regarding a 3d-long vector corresponding to each word in the query and each information domain as a context-based word expression of the word,
    wherein the generating matching features corresponding to each information domain according to obtained information comprises:
    generating local matching features corresponding to the each information domain according to obtained information;
    generating matching features corresponding to the each information domain according to the local matching features,
    wherein the generating local matching features corresponding to the each information domain according to obtained information comprises:
    in each information domain, according to the context-based word expressions of words and respectively in different matching degree calculating manners, calculating matching degree between one of words in the query and one of words in the information domain, to obtain a 3D tensor (m, n, t) corresponding to the information domain;
    wherein t represents a t-dimensional vector, t matching degrees are respectively calculated with respect to each group of words Q[i] and T[j], the t matching degrees constitute a t-dimensional vector, Q[i] represents words in the query, and T[j] represents words in the information domain;
    each value (i, j, k) in the tensor represents the $k^{th}$ matching degree corresponding to Q[i] and T[j], and $1 \leq k \leq t$.

2. The method according to claim 1, wherein the generating matching features corresponding to the each information domain according to the local matching features comprises:
    in the each information domain, inputting the (m, n, t) into convolutional neural network CNN, and regarding obtained output (m, n, t1), . . . (m, n, tw), as the matching features corresponding to the information domain, wherein w is a positive integer and represents the number of convolutional layers in the CNN.

3. The method according to claim 2, wherein the determining a matching degree score between the query and the to-be-queried document according to the matching features corresponding to the each information domain comprises:

in the each information domain, joining the corresponding (m, n, t) and the corresponding matching features so as to obtain (m, n, t+t1+ ... +tw);

in the each information domain, determining a (m, k') sequence expression in a manner of pooling as per row with respect to each (m, n) matrix, k' being a positive integer, to obtain (m, (t+t1+ ... +tw)*k');

joining (m, (t+t1+ ... +tw)*k') in at least two information domains to obtain (m, (t+t1+ ... +tw)*k'*p), wherein the p is the number of the information domains;

inputting the (m, (t+t1+ ... +tw)*k'*p) into bi-directional RNN to obtain an expression at a final position of bi-directional RNN;

determining the matching degree score according to the expression at a final position.

4. The method according to claim 3, wherein the determining a (m, k') sequence expression in a manner of pooling as per row with respect to each (m, n) matrix comprises:

selecting k' largest values from n values in each row of (m, n), and ranking in a descending order, wherein k'≤n.

5. The method according to claim 3, wherein the expression at a final position is a 2f-long vector, f represents an expression dimension;

the determining the matching degree score according to the expression at a final position comprises:

inputting the 2f-long vector into a fully-connected network including a single hidden layer to obtain the output matching degree score.

6. The method according to claim 1, wherein if the at least two information domains include content, the obtaining words in the each information domain in at least two information domains in a to-be-queried document specifically comprises:

obtaining the words in the content of the to-be-queried document.

7. The method according to claim 6, wherein the obtaining the words in the content of the to-be-queried document specifically comprises:

performing word segmentation processing for the content to obtain a word sequence formed by a plurality of words arranged in a sequential order in the content;

using a preset window to scan a plurality of words included by the word sequence in a successive order, to obtain a plurality of word segments;

calculating a BM25 score of the each word segment and the query;

obtaining, from the plurality of word segments, K word segments that have BM25 scores ranked top K in the order from large to small and do not overlap;

regarding the words included by the K word segments, as words when the information domain is the content.

8. The method according to claim 6, wherein the obtaining the words in the content of the to-be-queried document specifically comprises performing word segmentation processing for the content to obtain a plurality of words arranged in a sequential order in the content;

generating a bi-channel matching matrix according to the words in the query and the words in the plurality of words in the content;

inputting the bi-channel matching matrix into a convolutional neural network CNN, and extracting matching matrix generated by a top layer of CNN;

from the matching matrix generated by the top layer of CNN and by employing a pooling manner, selecting K positions with the scores ranked top K in the order from large to small, no window overlap existing between word segments corresponding to the positions and obtained by division according to a size of the preset window;

regarding words included in the word segments in windows corresponding to K positions, as words when the information domain is the content.

9. The method according to claim 8, wherein the generating a bi-channel matching matrix according to the words in the query and the words in the plurality of words in the content specifically comprises:

precisely comparing the words in the query with the words in the plurality of words of the content: if they are the same, a matching value at a position corresponding to a precise matching matrix is a weight of an Inverse Document Frequency of the words; if they are different, the value is 0 and a m*s-dimensional of precise matching matrix is obtained, wherein m is the number of words of words included in the query, and s is the number of the plurality of words included by the content;

embedding the words in the query and the words in the plurality of words of the content respectively into a low-dimensional vector;

respectively calculating a cosine similarity of the low-dimensional vector of the words in the query and the low-dimensional vector of the words in the plurality of words, and regarding the cosine similarity as a matching value at a corresponding position in a semantic-based matching matrix, to obtain a m*s-dimensional semantic-based matching matrix;

obtaining an m*s*2 bi-channel matching matrix according to the m*s-dimensional precise matching matrix and the m*s-dimensional semantic-based matching matrix.

10. A computer device, wherein the device comprises:
one or more processors;
a memory for storing one or more programs,
the one or more programs, when executed by said one or more processors, enabling said one or more processors to implement the following operation:

respectively obtaining words in a query, and words in each information domain in at least two information domains in a to-be-queried document;

respectively obtaining word expressions of words in the query and word expressions of words in each information domain in at least two information domains in the to-be-queried document;

based on the word expressions, respectively obtaining context-based word expressions of words in the query and context-based word expressions of words in the each information domain;

generating matching features corresponding to the each information domain according to obtained information;

determining a matching degree score between the query and the to-be-queried document according to the matching features corresponding to the each information domain, wherein the respectively obtaining word expressions of words in the query and word expressions of words in each information domain in at least two information domains in the to-be-queried document comprises:

respectively embedding words in the query into a low-dimensional vector, thereby obtaining a sequence Qe= [q1, ..., qi, ..., qm];

wherein m represents the number of words included in the query, and qi represents the low-dimensional vector of the $i^{th}$ word in the query, wherein i is a positive integer and 1≤i≤m;

respectively embedding words in the each information domain into a low-dimensional vector to obtain a sequence Te=[t1, ..., tj, ..., tn];

wherein n represents the number of words included in each information domain, and tj represents the low-dimensional vector of the $j^{th}$ word in the information domain, wherein j is a positive integer and 1≤j≤n, wherein the respectively obtaining context-based word expressions of words in the query and context-based word expressions of words in each information domain comprises:

inputting the Qe into a bi-directional recurrent neural network RNN to respectively obtain an output Q1 after processing in a left-right direction and an output Q2 after processing in a right-left direction;

inputting the Te into a bi-directional CNN to respectively obtain an output T1 after processing in a left-right direction and an output T2 after processing in a right-left direction;

joining the Qe, Q1 and Q2 to obtain a sequence Q(m, 3d), wherein d represents an expression dimension, and the embedding and the bi-directional RNNs use the same expression dimension;

joining the Te, T1 and T2 to obtain a sequence T(n, 3d);

regarding a 3d-long vector corresponding to each word in the query and each information domain as a context-based word expression of the word, wherein the generating matching features corresponding to each information domain according to obtained information comprises:

generating local matching features corresponding to the each information domain according to obtained information;

generating matching features corresponding to the each information domain according to the local matching features, wherein the generating local matching features corresponding to the each information domain according to obtained information comprises:

in each information domain, according to the context-based word expressions of words and respectively in different matching degree calculating manners, calculating matching degree between one of words in the query and one of words in the information domain, to obtain a 3D tensor (m, n, t) corresponding to the information domain;

wherein t represents a t-dimensional vector, t matching degrees are respectively calculated with respect to each group of words Q[i] and T[j], the t matching degrees constitute a t-dimensional vector, Q[i] represents words in the query, and T[j] represents words in the information domain;

each value (i, j, k) in the tensor represents the $k^{th}$ matching degree corresponding to Q[i] and T[j], and 1≤k≤t.

11. The computer device according to claim 10, wherein the generating matching features corresponding to the each information domain according to the local matching features comprises:

in the each information domain, inputting the (m, n, t) into convolutional neural network CNN, and regarding obtained output (m, n, t1), ..., (m, n, tw), as the matching features corresponding to the information domain, wherein w is a positive integer and represents the number of convolutional layers in the CNN.

12. The computer device according to claim 11, wherein the determining a matching degree score between the query and the to-be-queried document according to the matching features corresponding to the each information domain comprises:

in the each information domain, joining the corresponding (m, n, t) and the corresponding matching features so as to obtain (m, n, t+t1+ ... +tw);

in the each information domain, determining a (m, k') sequence expression in a manner of pooling as per row with respect to each (m, n) matrix, k' being a positive integer, to obtain (m, (t+t1+ ... +tw)*k');

joining (m, (t+t1+ ... +tw)*k') in at least two information domains to obtain (m, (t+t1+ ... +tw)*k'*p), wherein the p is the number of the information domains;

inputting the (m, (t+t1+ ... +tw)*k'*p) into bi-directional RNN to obtain an expression at a final position of bi-directional RNN;

determining the matching degree score according to the expression at a final position.

13. The computer device according to claim 12, wherein the determining a (m, k') sequence expression in a manner of pooling as per row with respect to each (m, n) matrix comprises:

selecting k' largest values from n values in each row of (m, n), and ranking in a descending order, wherein k'≤n.

14. The computer device according to claim 12, wherein the expression at a final position is a 2f-long vector, f represents an expression dimension;

the determining the matching degree score according to the expression at a final position comprises:

inputting the 2f-long vector into a fully-connected network including a single hidden layer to obtain the output matching degree score.

15. The computer device according to claim 10, wherein if the at least two information domains include content, the obtaining words in the each information domain in at least two information domains in a to-be-queried document specifically comprises:

obtaining the words in the content of the to-be-queried document.

16. The computer device according to claim 15, wherein the obtaining the words in the content of the to-be-queried document specifically comprises:

performing word segmentation processing for the content to obtain a word sequence formed by a plurality of words arranged in a sequential order in the content;

using a preset window to scan a plurality of words included by the word sequence in a successive order, to obtain a plurality of word segments;

calculating a BM25 score of the each word segment and the query;

obtaining, from the plurality of word segments, K word segments that have BM25 scores ranked top K in the order from large to small and do not overlap;

regarding the words included by the K word segments, as words when the information domain is the content.

17. The computer device according to claim 15, wherein the obtaining the words in the content of the to-be-queried document specifically comprises performing word segmentation processing for the content to obtain a plurality of words arranged in a sequential order in the content;

generating a bi-channel matching matrix according to the words in the query and the words in the plurality of words in the content;

inputting the bi-channel matching matrix into a convolutional neural network CNN, and extracting matching matrix generated by a top layer of CNN;

from the matching matrix generated by the top layer of CNN and by employing a pooling manner, selecting K positions with the scores ranked top K in the order from large to small, no window overlap existing between word segments corresponding to the positions and obtained by division according to a size of the preset window;

regarding words included in the word segments in windows corresponding to K positions, as words when the information domain is the content.

18. The computer device according to claim 17, wherein the generating a bi-channel matching matrix according to the words in the query and the words in the plurality of words in the content specifically comprises:

precisely comparing the words in the query with the words in the plurality of words of the content: if they are the same, a matching value at a position corresponding to a precise matching matrix is a weight of an Inverse Document Frequency of the words; if they are different, the value is 0 and a m*s-dimensional of precise matching matrix is obtained, wherein m is the number of words of words included in the query, and s is the number of the plurality of words included by the content;

embedding the words in the query and the words in the plurality of words of the content respectively into a low-dimensional vector;

respectively calculating a cosine similarity of the low-dimensional vector of the words in the query and the low-dimensional vector of the words in the plurality of words, and regarding the cosine similarity as a matching value at a corresponding position in a semantic-based matching matrix, to obtain a m*s-dimensional semantic-based matching matrix;

obtaining an m*s*2 bi-channel matching matrix according to the m*s-dimensional precise matching matrix and the m*s-dimensional semantic-based matching matrix.

19. A non-transitory computer readable medium on which a computer program is stored, wherein the program, when executed by a processor, implements the following operation:

respectively obtaining words in a query, and words in each information domain in at least two information domains in a to-be-queried document;

respectively obtaining word expressions of words in the query and word expressions of words in each information domain in at least two information domains in the to-be-queried document;

based on the word expressions, respectively obtaining context-based word expressions of words in the query and context-based word expressions of words in the each information domain;

generating matching features corresponding to the each information domain according to obtained information;

determining a matching degree score between the query and the to-be-queried document according to the matching features corresponding to the each information domain, wherein the respectively obtaining word expressions of words in the query and word expressions of words in each information domain in at least two information domains in the to-be-queried document comprises:

respectively embedding words in the query into a low-dimensional vector, thereby obtaining a sequence Qe=[q1, . . . , qi, . . . , qm];

wherein m represents the number of words included in the query, and qi represents the low-dimensional vector of the $i^{th}$ word in the query, wherein i is a positive integer and $1 \leq i \leq m$;

respectively embedding words in the each information domain into a low-dimensional vector to obtain a sequence Te=[t1, tj, . . . , tn];

wherein n represents the number of words included in each information domain, and tj represents the low-dimensional vector of the $j^{th}$ word in the information domain, wherein j is a positive integer and $1 \leq j \leq n$, wherein the respectively obtaining context-based word expressions of words in the query and context-based word expressions of words in each information domain comprises:

inputting the Qe into a bi-directional recurrent neural network RNN to respectively obtain an output Q1 after processing in a left-right direction and an output Q2 after processing in a right-left direction;

inputting the Te into a bi-directional CNN to respectively obtain an output T1 after processing in a left-right direction and an output T2 after processing in a right-left direction;

joining the Qe, Q1 and Q2 to obtain a sequence Q(m, 3d), wherein d represents an expression dimension, and the embedding and the bi-directional RNNs use the same expression dimension;

joining the Te, T1 and T2 to obtain a sequence T(n, 3d);

regarding a 3d-long vector corresponding to each word in the query and each information domain as a context-based word expression of the word, wherein the generating matching features corresponding to each information domain according to obtained information comprises:

generating local matching features corresponding to the each information domain according to obtained information;

generating matching features corresponding to the each information domain according to the local matching features, wherein the generating local matching features corresponding to the each information domain according to obtained information comprises:

in each information domain, according to the context-based word expressions of words and respectively in different matching degree calculating manners, calculating matching degree between one of words in the query and one of words in the information domain, to obtain a 3D tensor (m, n, t) corresponding to the information domain;

wherein t represents a t-dimensional vector, t matching degrees are respectively calculated with respect to each group of words Q[i] and T[j], the t matching degrees constitute a t-dimensional vector, Q[i] represents words in the query, and T[j] represents words in the information domain;

each value (i, j, k) in the tensor represents the $k^{th}$ matching degree corresponding to Q[i] and T[j], and $1 \leq k \leq t$.

20. The non-transitory computer readable medium according to claim 19, wherein the generating matching features corresponding to the each information domain according to the local matching features comprises:

in the each information domain, inputting the (m, n, t) into convolutional neural network CNN, and regarding obtained output (m, n, t1), ... (m, n, tw), as the matching features corresponding to the information domain, wherein w is a positive integer and represents the number of convolutional layers in the CNN.

21. The non-transitory computer readable medium according to claim 20, wherein the determining a matching degree score between the query and the to-be-queried document according to the matching features corresponding to the each information domain comprises:
in the each information domain, joining the corresponding (m, n, t) and the corresponding matching features so as to obtain (m, n, t+t1+ ... +tw);
in the each information domain, determining a (m, k') sequence expression in a manner of pooling as per row with respect to each (m, n) matrix, k' being a positive integer, to obtain (m, (t+t1+ ... +tw)*k');
joining (m, (t+t1+ ... +tw)*k') in at least two information domains to obtain (m, (t+t1+ ... +tw)*k'*p), wherein the p is the number of the information domains;
inputting the (m, (t+t1+ ... +tw)*k'*p) into bi-directional RNN to obtain an expression at a final position of bi-directional RNN;
determining the matching degree score according to the expression at a final position.

22. The non-transitory computer readable medium according to claim 21, wherein the determining a (m, k') sequence expression in a manner of pooling as per row with respect to each (m, n) matrix comprises:
selecting k' largest values from n values in each row of (m, n), and ranking in a descending order, wherein k'≤n.

23. The non-transitory computer readable medium according to claim 21, wherein the expression at a final position is a 2f-long vector, f represents an expression dimension;
the determining the matching degree score according to the expression at a final position comprises:
inputting the 2f-long vector into a fully-connected network including a single hidden layer to obtain the output matching degree score.

24. The non-transitory computer readable medium according to claim 19, wherein if the at least two information domains include content, the obtaining words in the each information domain in at least two information domains in a to-be-queried document specifically comprises:
obtaining the words in the content of the to-be-queried document.

25. The non-transitory computer readable medium according to claim 24, wherein the obtaining the words in the content of the to-be-queried document specifically comprises:
performing word segmentation processing for the content to obtain a word sequence formed by a plurality of words arranged in a sequential order in the content;
using a preset window to scan a plurality of words included by the word sequence in a successive order, to obtain a plurality of word segments;
calculating a BM25 score of the each word segment and the query;
obtaining, from the plurality of word segments, K word segments that have BM25 scores ranked top K in the order from large to small and do not overlap;
regarding the words included by the K word segments, as words when the information domain is the content.

26. The non-transitory computer readable medium according to claim 24, wherein the obtaining the words in the content of the to-be-queried document specifically comprises
performing word segmentation processing for the content to obtain a plurality of words arranged in a sequential order in the content;
generating a bi-channel matching matrix according to the words in the query and the words in the plurality of words in the content;
inputting the bi-channel matching matrix into a convolutional neural network CNN, and extracting matching matrix generated by a top layer of CNN;
from the matching matrix generated by the top layer of CNN and by employing a pooling manner, selecting K positions with the scores ranked top K in the order from large to small, no window overlap existing between word segments corresponding to the positions and obtained by division according to a size of the preset window;
regarding words included in the word segments in windows corresponding to K positions, as words when the information domain is the content.

27. The non-transitory computer readable medium according to claim 26, wherein the generating a bi-channel matching matrix according to the words in the query and the words in the plurality of words in the content specifically comprises:
precisely comparing the words in the query with the words in the plurality of words of the content: if they are the same, a matching value at a position corresponding to a precise matching matrix is a weight of an Inverse Document Frequency of the words; if they are different, the value is 0 and a m*s-dimensional of precise matching matrix is obtained, wherein m is the number of words of words included in the query, and s is the number of the plurality of words included by the content;
embedding the words in the query and the words in the plurality of words of the content respectively into a low-dimensional vector;
respectively calculating a cosine similarity of the low-dimensional vector of the words in the query and the low-dimensional vector of the words in the plurality of words, and regarding the cosine similarity as a matching value at a corresponding position in a semantic-based matching matrix, to obtain a m*s-dimensional semantic-based matching matrix;
obtaining an m*s*2 bi-channel matching matrix according to the m*s-dimensional precise matching matrix and the m*s-dimensional semantic-based matching matrix.

* * * * *